Figure 5:
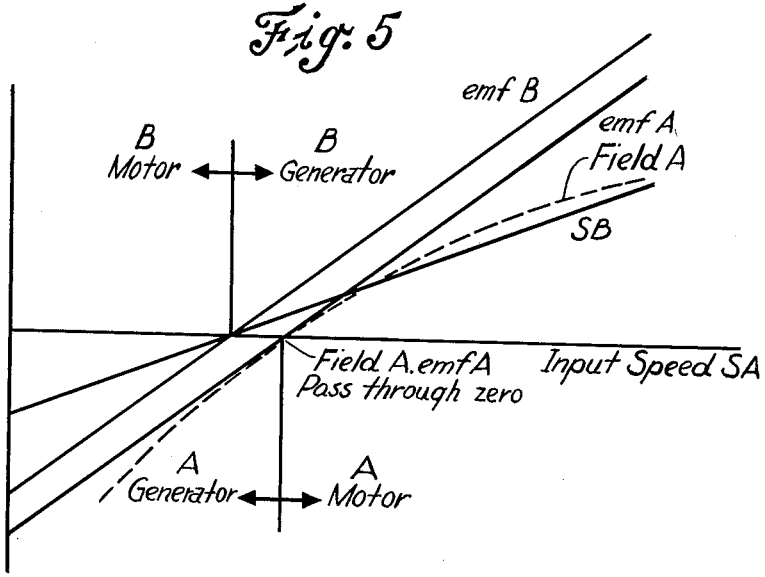

Oct. 2, 1962         F. M. POTTER         3,056,914
CONSTANT FREQUENCY GENERATOR SYSTEM
Filed June 12, 1958         3 Sheets-Sheet 1
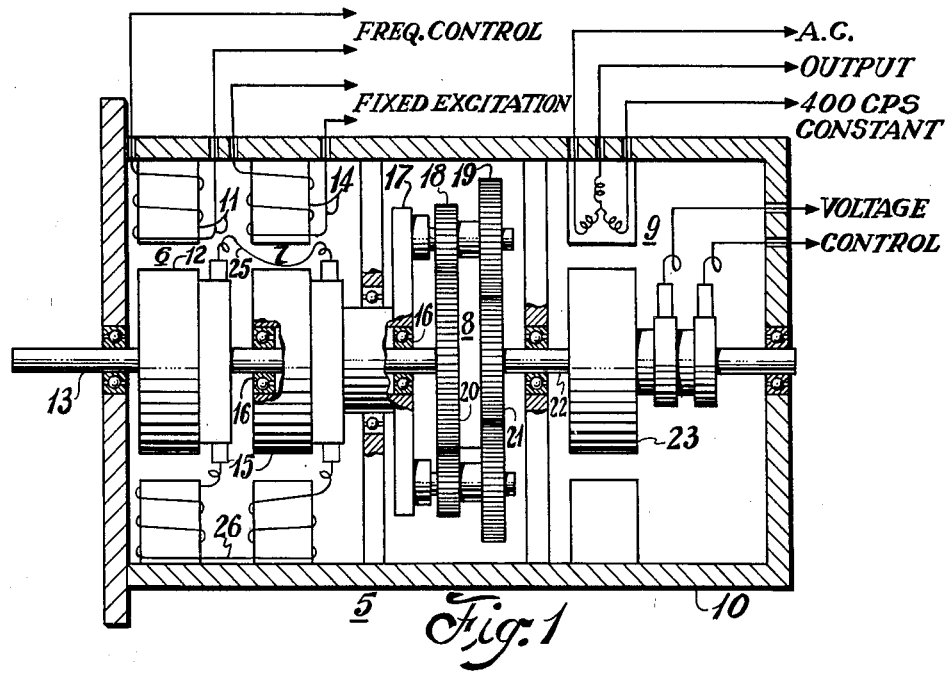
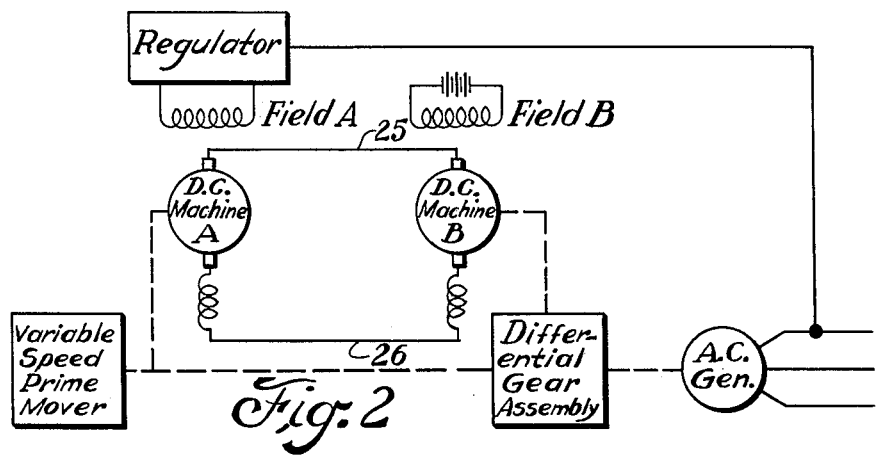
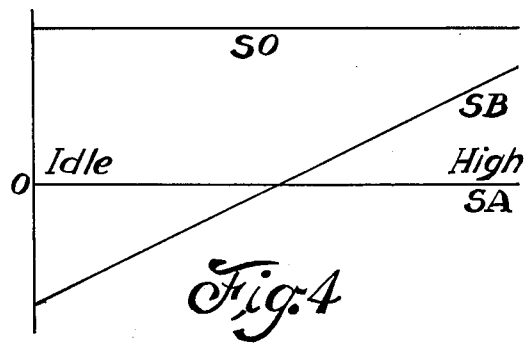
INVENTOR.
FREDERICK M. POTTER
BY
*James M. Nickels*
ATTORNEY

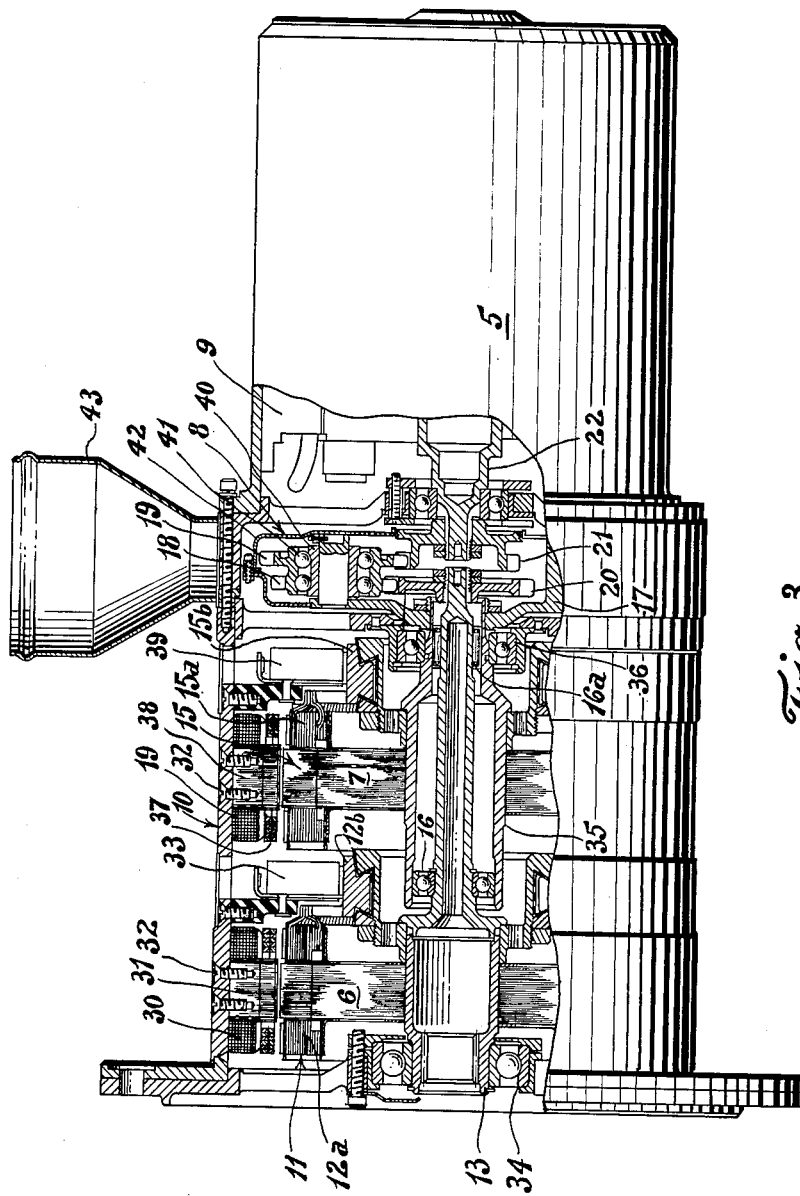

Oct. 2, 1962 F. M. POTTER 3,056,914
CONSTANT FREQUENCY GENERATOR SYSTEM
Filed June 12, 1958 3 Sheets-Sheet 3

INVENTOR.
FREDERICK M. POTTER
BY
ATTORNEY

United States Patent Office 3,056,914
Patented Oct. 2, 1962

3,056,914
CONSTANT FREQUENCY GENERATOR SYSTEM
Frederick M. Potter, Westwood, N.J., assignor to The Bendix Corporation, a corporation of Delaware
Filed June 12, 1958, Ser. No. 741,535
6 Claims. (Cl. 322—40)

The present invention relates to a constant output speed system and more particularly to a constant frequency generator drive system.

In many instances it is desirable to obtain a constant output speed from a variable speed source. Various types of hydraulic drives have been employed in the past. However, they are quite complicated, bulky, difficult to maintain and require complex controls.

The present invention provides an electric constant speed drive system which utilizes two D.C. dynamoelectric machines and a differential type gear which either adds to or subtracts from the speed of the input shaft.

It is an object of the invention to provide a novel constant output speed system.

Another object of the invention is to provide a novel constant frequency generator drive system.

Another object of the invention is to provide means for obtaining a constant speed output from a variable speed input.

Another object of the invention is to provide a novel electrical constant frequency generator system which is extremely fast in response and has extreme precision control.

Another object of the invention is to provide a novel electric constant frequency generator drive system.

Another object of the invention is to provide an improved drive control for a dynamoelectric machine.

The above and other objects and features of the invention will appear more fully hereinafter from a consideration of the following description taken in connection with the accompanying drawing wherein two embodiments are illustrated by way of example.

Figure 6:
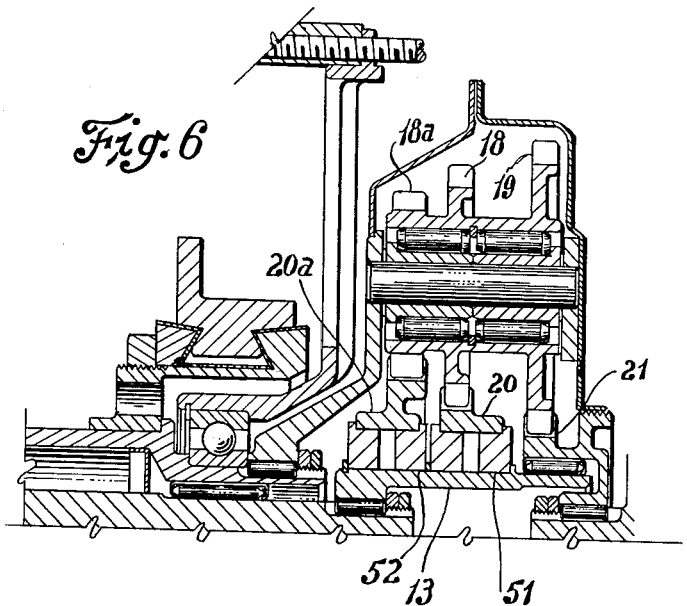

In the drawings:

FIGURE 1 is a diagrammatical representation of a constant speed drive generating system. FIGURE 2 is a block diagram of a generating system embodying the invention. FIGURE 3 is a partial cutaway view of a dynamoelectric machine illustrating one embodiment of the invention. FIGURE 4 is a curve illustrating the speed characteristics of the system. FIGURE 5 is a plot of electrical variables versus input speed. FIGURE 6 illustrates a modification of FIGURE 3.

In the drawings, the same reference numerals have been assigned to like parts in the various figures. Reference is now made to FIGURE 1 in which a generating system is indicated generally by the numeral 5 and includes a first D.C. machine 6, a second D.C. machine 7, gear assembly 8 and A.C. generator 9 enclosed in a housing 10. The D.C. machine 6 has a field winding 11 supported in the housing 10 and an armature 12 mounted on an input shaft 13. The input shaft 13 is driven from any suitable variable speed source (not shown). The machine 7 has a field winding 14 supported in the housing 10 and an armature 15 mounted for rotation relative to the shaft 13 by bearings 16. A planet cage 17 of the gear assembly 8 is secured to the armature 15 of the machine 7 for rotation therewith. Mounted on the planet cage 17 are gears 18 and 19. The gear 18 engages gear 20 which is mounted for rotation by the shaft 13. The gear 19 engages a gear 21 secured to an output shaft 22 connected to drive the rotor 23 of generator 9. The field winding 11 of the machine 6 is energized, in a direction depending upon the deviation from a predetermined frequency, by a frequency regulator 24 connected to the output of the generator 9. The field winding 14 of the machine 7 is separately energized to provide a fixed excitation therefor. The armatures 12 and 15 are connected in a parallel loop circuit by conductors 25 and 26. Excitation and voltage regulation for the generator 9 may be in any conventional manner. While the armatures have been shown connected together electrically, it is understood that the interpole and compensating windings of both machines are included in the interconnection. In other words the connections are the same as those of two D.C. generators operating in parallel with the connecting leads being of low resistance.

Referring now to FIGURE 3, a constant frequency generator is indicated generally by the numeral 5 and includes a first D.C. machine 6, a second D.C. machine 7, a gear assembly 8 and A.C. generator 9 enclosed in a housing 10.

The machine 6 has a shunt field winding 11 and interpole and compensating windings 30 wound on pole shoes 31. The pole shoes 31 are secured to the housing 10 by screws 32 or in any other conventional manner. An armature 12 for the machine 6 includes armature windings 12a and commutator 12b and is mounted for rotation on input shaft 13. Brush assemblies 33 are provided for making electrical connections thereto.

One end of the shaft 13 is mounted in the housing 10 by bearing 34. The shaft 13 has a reduced portion 13a which extends through a shaft 35 and is positioned for rotation relative thereto by bearings 16 and 16a. The shaft 35 is supported in the housing 10 by a bearing 36.

An armature 15, including armature windings 15a and commutator 15b, for the machine 7, is mounted for rotation on the shaft 35. The machine 7 has a shunt field winding 14 and interpole and compensating winding 37 wound on pole shoes 38. The pole shoes 38 are secured to the housing 10 by screws 32. Brush assemblies 39 are provided for making electrical contact with the armature 15.

The other end of the shaft 13 has a sun gear 20 secured for rotation therewith by splines or in any other conventional manner. The gear 20 engages gear 18 of a double spur gear 18—19 which is mounted on planet cage 17 by shaft 40 and bearing 41. The planet cage 17 is secured to the shaft 35 for rotation therewith. Gear 19 of the double spur gear 18—19 meshes with gear 21 which is secured on shaft 22 for rotation therewith. A housing 42 is provided for the gear train 8. An inlet 43 is provided to supply cooling air to the gears and electrical units. The rotor 23 of the A.C. generator 9 is mounted on the shaft 22.

For a better understanding reference is now made to the block diagram of FIGURE 2 in which the dashed lines indicate a mechanical connection and the solid lines an electrical connection. Inasmuch as the prime mover is variable speed, it cannot be geared directly to the output shaft to provide a constant output speed, but must be connected to a controllable differential gear assembly. A second input shaft, driven by machine 7, is provided and drives the cage of the gear assembly. The A.C. generator, coupled to the output of the differential gear assembly, has a speed related to the speeds of the two differential unit inputs by the following formula:

$$(1) \quad S_B = \frac{S_o - S_A R}{1 - R}$$

where
$S_o$=differential unit output speed or generator speed
$S_A$=speed of main input shaft
$S_B$=speed of second input shaft
$R$=a gear ratio $S_o/S_A$ with $B$ fixed.

The gear ratio is selected so that at some point near the center of the main input shaft speed range, the A.C. generator is driven at the required output speed with the second input shaft stationary. As the main input shaft drops below this "crossover point," the output speed can be maintained constant by driving the second input shaft in a direction which will augment the effect of the main input shaft. Conversely, when the speed of the main input shaft rises above the "crossover point," the second input shaft must reverse its direction of rotation to keep the output shaft at the required speed. The aforenoted action is accomplished by means of the two D.C. machines, A and B. Machine A is coupled directly to the main input shaft and is electrically connected in a closed loop with the machine B, which is coupled directly to the second input shaft.

Thus, it can be seen that there are two paths for power to follow between the main input shaft and the output shaft:

(1) Mechanical coupling, through differential gear assembly. This path carries most of the load.
(2) Mechanical/electrical conversion in machine A; electrical/mechanical conversion in machine B; mechanical coupling through differential gear assembly. This path is controlled to maintain the output constant.

As the speed of the main input shaft increases from a low value through intermediate to a high value, the speed of machine B automatically changes from high in one direction through zero ("crossover") to high in the opposite direction. Speed characteristics are shown by the curves of FIGURE 4.

In a differential gear assembly, the input and output torques are always in constant proportion to one another, the constants being the gear ratios. The present system utilizes two "inputs" and one "output." Thus, whatever the individual shaft speeds may be, the three shaft torques are always related to one another by constant multipliers. As the alternator speed is held constant by the action of the regulator, its shaft torque is closely proportioned to its electrical load and always in one direction. Thus, for a specific alternator electrical load, torque at the two differential input shafts must be of constant magnitude, and in the same direction, for all shaft speeds. Inasmuch as the machine B reverses direction of rotation as the speed of the main input shaft passes "crossover," it can be seen that machine B acts as a motor when $S_A$ is low, and as a dynamic brake when $S_A$ is high.

Machine B is fully compensated and has a constant field excitation, hence it will generate constant torque, independent of speed, provided its armature current is held constant. The armatures of machines A and B are directly connected, therefore, the common armature current is forced through the resistance of the two armatures by the difference between the voltages generated in the two armatures, as shown in FIGURE 5. For a constant armature current, this difference is kept constant, and is proportional to the current and armature resistance.

As the field excitation of machine B is fixed, the E.M.F. machine B is directly proportional to $S_B$. Therefore, the field excitation of machine A must be adjusted, at any $S_A$, to provide sufficient E.M.F. to drive the current required by the torque considerations through the armature circuit. The field of machine A is excited by control circuits which automatically establish the necessary E.M.F.

FIGURE 6 illustrates a modification which by substituting a gear assembly 50 for the gear assembly 8, the system can be used in a reversible direction as an A.C. motor for starting a jet engine. In addition to the sun gear 20 a sun gear 20A is provided and is adapted to mesh with a planet gear 18A. The sun gears 20 and 20A are secured to the shaft 13 by overrunning clutches 51 and 52 respectively. The clutch 51 permits the transfer of torque in a direction to drive the A.C. machine in the proper direction while the clutch 52 permits the transfer of torque in the reverse direction. Thus, by energizing the A.C. machine from a source of A.C. power and operating it as a synchronous motor it can be utilized for starting. In this situation the excitation for the field of machine A is fixed and the excitation for the field of machine B variable. By proper sensing and control, the load on the A.C. motor can be kept constant during the starting interval.

Although only two embodiments of the invention have been illustrated and described, various changes in the form and relative arrangement of the parts, which will now appear to those skilled in the art, may be made without departing from the scope of the invention.

What is claimed is:
1. A constant frequency generating system comprising a main input shaft, a first D.C. machine having a field winding and an armature winding, said armature winding being mounted on and rotatable with said main input shaft, a second input shaft, a second D.C. machine having a field winding and an armature winding, said last armature winding being mounted on and rotatable with said second shaft, an A.C. generator, means including a differential gear assembly for connecting said input shafts in driving relationship with said A.C. generator, means connecting said armatures in a closed loop, a fixed excitation for the field of said second D.C. machine, and a variable excitation responsive to an output condition of said A.C. generator for the field of said first D.C. machine.

2. A constant frequency generating system adapted to be driven from a variable speed source, comprising an input shaft, a first dynamoelectric machine connected for rotation with said input shaft, a second dynamoelectric machine, an output shaft connected for rotation with said second dynamoelectric machine, an alternator, a differential gear assembly connecting said input and output shafts to said alternator, means electrically connecting said dynamoelectric machines in parallel, a fixed excitation for said second dynamoelectric machine, and means connected to excite said first dynamoelectric machine in accordance with an output condition of said alternator.

3. A constant speed drive system comprising an input shaft, a first dynamoelectric machine having an armature and a field winding, said armature being mounted for rotation with said input shaft, a second dynamoelectric machine having an armature and a field winding, said last armature being rotatable in either direction, an output shaft, differential gear means connecting said input shaft and said last armature to said output shaft, circuit means connecting said armatures in a closed loop, a fixed excitation for said last field winding, and means responsive to the deviation of said output shaft from a predetermined speed to energize said first field winding whereby the current flowing in said closed loop causes the armature of said second machine to turn in a direction to maintain said predetermined speed.

4. A constant speed generator system comprising a variable speed input shaft, an alternator, differential gear means connecting said input shaft to said alternator, and a pair of interconnected D.C. machines responsive to an output condition of said alternator to affect said differential gear means in a direction to maintain said alternator at a constant predetermined speed.

5. A dynamoelectric machine system comprising an alternator current dynamoelectric machine, a pair of interconnected D.C. dynamoelectric machines, differential gearing means connecting said D.C. machines to said alternating current machine, and control means responsive to an output condition of said system to energize said D.C. machines whereby said alternating current machine is maintained at synchronous speed.

6. A starter generator for a jet engine comprising shaft means for connecting to said engine, a first D.C. machine having an armature mounted for rotation with said shaft, a second D.C. machine having an armature rotatable in either direction, circuti means interconnecting said D.C. machines, an A.C. machine, dual differential gear means including an overrunning clutch to permit transfer of torque in one direction by one set of the dual gears and in the opposite direction by the other set of the dual gears connecting said shaft means and the armature of said second D.C. machine to said A.C. machine, and control means for energizing said D.C. machines to maintain a predetermined condition of said A.C. machine.

References Cited in the file of this patent

UNITED STATES PATENTS

| | | |
|---|---|---|
| 2,597,357 | McCormick | May 20, 1952 |
| 2,900,594 | Bessiere | Aug. 18, 1959 |

FOREIGN PATENTS

| | | |
|---|---|---|
| 541,105 | Great Britain | Nov. 13, 1941 |
| 558,334 | France | Mar. 25, 1923 |